United States Patent [19]  [11] Patent Number: 4,459,046
Spirg  [45] Date of Patent: Jul. 10, 1984

[54] TEMPERATURE INDICATOR

[76] Inventor: Ernst Spirg, P.O. Box 160, CH-8640 Rapperswil, Switzerland

[21] Appl. No.: 343,305

[22] Filed: Jan. 27, 1982

[30] Foreign Application Priority Data

Feb. 6, 1981 [GB] United Kingdom ............... 8103735
Apr. 23, 1981 [GB] United Kingdom ............... 8112630

[51] Int. Cl.$^3$ ............................................. G01K 11/16
[52] U.S. Cl. ..................................... 374/162; 374/161; 116/216; 116/207
[58] Field of Search ................ 374/161, 162; 116/216, 116/207

[56] References Cited

U.S. PATENT DOCUMENTS

| 2,308,087 | 1/1943 | Lappala | 116/207 |
| 3,065,083 | 11/1962 | Gessler | 116/207 |
| 3,826,141 | 7/1974 | Pickett et al. | 374/162 |
| 3,877,411 | 4/1975 | MacDonald | 374/162 |
| 3,951,133 | 4/1976 | Reese | 374/162 |
| 4,198,861 | 4/1980 | Mung-Kuen Luk | 374/162 |

FOREIGN PATENT DOCUMENTS

| 2748023 | 7/1978 | Fed. Rep. of Germany | 374/162 |
| 1604649 | 5/1978 | United Kingdom | 116/216 |

Primary Examiner—Steven L. Stephan
Assistant Examiner—David R. Schuster
Attorney, Agent, or Firm—Laubscher, Philpitt & Laubscher

[57] ABSTRACT

A self-adhesive temperature indicator comprises a piece of transparent or translucent foil (10), one side being provided, over at least a region thereof, with a layer (12) of material which changes color at a predetermined temperature, over at least another region thereof with a printed layer (14), for example of a material having a visual characteristic (e.g. its own color) denoting the predetermined temperature, and over at least another region (preferably a peripheral margin) with a coating (18) of adhesive.

5 Claims, 2 Drawing Figures

TEMPERATURE INDICATOR

BACKGROUND OF THE INVENTION

The present invention relates to a self-adhesive temperature indicator—see e.g. U.S. Pat. No. 3,002,385.

Self-adhesive temperature indicators are known in which a layer of material (which changes color at a predetermined temperature) is provided on a piece of transparent or translucent foil. It is common to print a colored layer over an area of the foil, for various purposes. The usual arrangement is for the printed layer to be on the upper side of the foil and the indicating material and a layer of adhesive on the under-side. However, it is desirable to protect the printed layer, but if it is placed on the under-side, it will be disposed between the foil and the adhesive: it would, however, not be able to transmit the necessary mechanical forces and would disintegrate.

SUMMARY OF THE INVENTION

In accordance with the present invention, there is provided a self-adhesive temperature indicator, comprising a piece of transparent or translucent foil, one side of the foil having, over at least a region thereof, a layer of a material which changes color at a predetermined temperature, the one side of the foil having a printed layer of material over at least another region thereof, and the one side of the foil being coated with adhesive over at least a further region thereof.

The coating of adhesive preferably extends over the whole area of the one side of the foil, being not only in direct contact with the foil over the further region but also coating the outer surfaces of the layers of color-change (or indicating) and printed material. Preferably, the directly adhesive-coated region extends around the peripheral margin of the piece of foil.

In an embodiment to be described herein, the piece of foil is circular and the layer of indicating material is also circular and positioned concentrically at the center of the piece of foil. The layer of printed material is an annulus around the circle of indicating material and its own color may form a characteristic which denotes the temperature: thus this material might be grey to denote that the indicating material will change color at say 60° C. The further region, directly coated with adhesive, is an annulus around the peripheral margin of the piece of foil. The indicating material, printed material and adhesive layer are all on said one side of the piece of foil. Thus, once the temperature indicator is applied to and secured to a surface by its self-adhesive, the foil protects these layers. The annulus at the peripheral margin, where the foil is directly coated with adhesive, is advantageous compared with arrangements where all the adhesive is applied to the layers of other materials, for mechanical reasons: thus, under bending forces these materials (e.g. if the printed material extended to the peripheral edge of the foil) could separate from the foil and the temperature indicator could consequently disintegrate.

BRIEF DESCRIPTION OF THE FIGURES

This embodiment of the invention will now be described, by way of example only, with reference to the accompanying drawing, in which.

DETAILED DESCRIPTION

Figure 1:
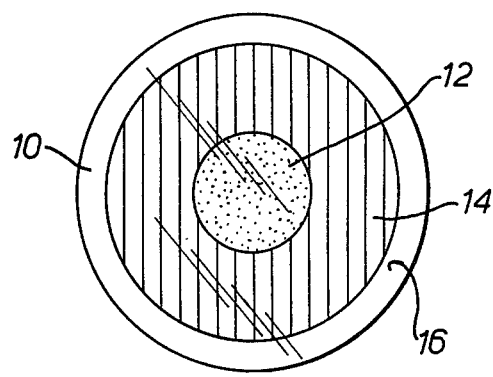
FIG. 1 is a top plan view of a temperature indicator according to the invention.
Figure 2:
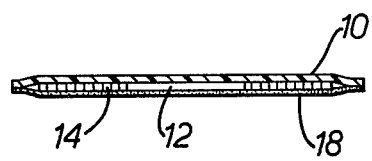
FIG. 2 is a sectional view of the temperature indicator of FIG. 1.

The temperature indicator shown in FIGS. 1 and 2 comprises a circular piece of transparent foil 10. A circular, centrally disposed layer 12 of material is provided on one side of the foil and is such as to change color (e.g. from white to black) at a predetermined temperature, say 60° C. A colored annulus 14 is provided by printing on the one side of the foil and its color may be selected (according to a predetermined code) to denote the temperature at which the spot 12 changes color (e.g. grey for a 60° C. indicator). Alternatively, the color of this printed layer may be selected to match the color of the surface to which the indicator is to be applied, or to ensure a maximum contrast between the color of the print layer and the color of the indicating layer below the predetermined temperature. An annulus 16 of foil remains free of such printed layer, around the peripheral margin of the foil. The whole one side of the foil is coated with a layer of adhesive 18. In use, the temperature indicator is applied to a surface and attached thereto by the adhesive. The printed layer 14 and the spot 12 are visible through the foil itself.

Suitable chemical compositions for the temperature-sensitive material are well known and commercially available. One example is a paint employing appropriate pigments. For example, a 60° C. abrupt characteristic is obtained from a composition of 50 grams of Cobalt acetate milled into a resin like 100 grams "Badacryl" (supplied under this Trade Mark by Imperial Chemical Industries, England) and 50 grams of a convenient solvent to provide a paint composition.

For irreversible compositions, a paint composition may be prepared for a 235° C. characteristic by 50 grams hydrated ferric oxide, 100 grams "Badacryl" resin and a solvent.

Another example of an irreversible mixture is a mixture of the chemicals orthochloronitrobenzene and orthobromoritrobenzene.

The predetermined temperature of color-change can in all cases be varied by controlling the ratio of the mixed components.

I claim:

1. A temperature indicator device for indicating the temperature of a body, comprising
   (a) a generally planar layer of transparent foil (10);
   (b) a layer of color-changeable material (12) arranged adjacent a first portion of one surface of said foil layer, said material being operable to change color at a predetermined temperature;
   (c) a layer of printed indicator material (14) arranged adjacent a second portion of said one foil surface, said layer of printed indicator material being coplanar with said layer of color-changeable material; and
   (d) a layer of adhesive (18) applied to at least a third portion of said one foil surface extending continuously around the peripheral margin of said layer of foil, whereby when said temperature indicator is adhesively secured to the body, said foil layer extends protectively across said layer of color-changing and printed material.

2. Apparatus as defined in claim 1, wherein said adhesive layer is further applied both to said layer of color-changing material and to said layer of printed material.

3. Apparatus as defined in claim 2, wherein said one foil surface third portion extends continuously around the peripheral margin of said layer of foil.

4. Apparatus as defined in claim 1, wherein said layer of printed material is colored to indicate the temperature of color change of said color-changing material.

5. A temperature indicator device for indicating the temperature of a body, comprising
   (a) a generally planar layer of transparent foil (10) having a circular configuration;
   (b) a layer of color-changeable material (12) having a circular configuration and a diameter less than the diameter of said foil, said layer of color changeable material being concentrically arranged adjacent a first portion of one surface of said foil layer, said material being operable to change color at a predetermined temperature;
   (c) an annular layer of printed indicator material (14) arranged adjacent a second portion of said one foil surface, said layer of printed material being concentrically arranged in coplanar relation with said layer of color-changeable material; and
   (d) a layer of adhesive applied to said layers of color-changing and printed material and to a third portion of said one foil surface extending continuously around the peripheral margin of said layer of foil, whereby when said temperature indicator is adhesively secured to the body, said foil layer extends protectively across said layers of color-changing and printed material.

* * * * *